United States Patent
Kobayashi et al.

(10) Patent No.: US 11,486,499 B2
(45) Date of Patent: Nov. 1, 2022

(54) GATE VALVE (71) Applicant: KITZ CORPORATION, Chiba (JP)

(72) Inventors: Tetsuya Kobayashi, Chino (JP); Yuri Kobayashi, Chino (JP)

(73) Assignee: KITZ CORPORATION, Chiba (JP)

( * ) Notice: Subject to any disclaimer, the term of this patent is extended or adjusted under 35 U.S.C. 154(b) by 0 days.

(21) Appl. No.: 17/312,118

(22) PCT Filed: Dec. 13, 2019

(86) PCT No.: PCT/JP2019/048968
§ 371 (c)(1),
(2) Date: Jun. 9, 2021

(87) PCT Pub. No.: WO2020/122233
PCT Pub. Date: Jun. 18, 2020

(65) Prior Publication Data
US 2022/0034408 A1   Feb. 3, 2022

(30) Foreign Application Priority Data

Dec. 14, 2018 (JP) .............................. JP2018-233949

(51) Int. Cl.
*F16K 3/12* (2006.01)
*F16K 27/04* (2006.01)
*F16K 3/02* (2006.01)

(52) U.S. Cl.
CPC .............. *F16K 3/12* (2013.01); *F16K 3/0254* (2013.01); *F16K 27/047* (2013.01)

(58) Field of Classification Search
CPC ........ F16K 3/12; F16K 27/047; F16K 3/0254; F16K 31/50; F16K 31/46

(Continued)

(56) References Cited

U.S. PATENT DOCUMENTS 880,463 A * 2/1908 Paul ...................... F16K 3/0227
251/328
1,882,227 A  10/1932 Mohr
(Continued)

FOREIGN PATENT DOCUMENTS

CN    103775666    5/2014
FR    772 599      11/1934
(Continued)

OTHER PUBLICATIONS

International Search Report dated Feb. 4, 2020 International (PCT) Application No. PCT/JP2019/048968.
(Continued)

*Primary Examiner* — John Bastianelli
(74) *Attorney, Agent, or Firm* — Wenderoth, Lind & Ponack, L.L.P.

(57) ABSTRACT

A wedge-shaped gate valve with a branching part formed to be open in a direction orthogonal to an inner flow path of a valve box having a coupling part on both sides, and a valve disk ascends and descends from the branching part via a valve stem to open and close an annular valve seat surface. At a boundary between the coupling part and the branching part, a reinforcing thickened part having a cylindrical, cone, or truncated cone shape with a diameter gradually reducing from the branching part toward the coupling part side is provided, and the thickened part is formed by taking, as an outer shape, a cylinder, a cone, or a truncated cone with an axis P2 that is eccentric from a center line P1 of the flow path to the branching part side and is parallel to or crossing the center line P1 as a rotation axis.

4 Claims, 5 Drawing Sheets

(58) Field of Classification Search
USPC .................................................. 251/326–329
See application file for complete search history.

(56) References Cited

U.S. PATENT DOCUMENTS

| | | | | |
|---|---|---|---|---|
| 2,194,261 A | * | 3/1940 | Allen | F16K 3/12 |
| | | | | 251/328 |
| 2,626,775 A | * | 1/1953 | Lange | F16K 27/047 |
| | | | | 137/315.31 |
| 3,837,617 A | | 9/1974 | Eminger et al. | |
| 3,871,615 A | | 3/1975 | Donner | |
| 4,044,997 A | * | 8/1977 | Schelat | F16K 3/12 |
| | | | | 251/328 |
| 4,389,037 A | * | 6/1983 | Anders | F16K 3/30 |
| | | | | 251/327 |
| 4,541,613 A | | 9/1985 | Barbe | |
| 6,068,018 A | * | 5/2000 | Robert | F16K 3/12 |
| | | | | 251/368 |
| 2017/0016551 A1 | * | 1/2017 | Villanueva | F16K 3/0254 |

FOREIGN PATENT DOCUMENTS

| | | |
|---|---|---|
| JP | 57-98381 | 6/1982 |
| JP | 61-182464 | 11/1986 |
| JP | 5094753 | 12/2012 |

OTHER PUBLICATIONS

Extended European Search Report dated Jul. 27, 2022 in corresponding European Application No. 19896412.4.

* cited by examiner

GATE VALVE

BACKGROUND OF THE INVENTION

1. Technical Field

The present invention relates to gate valves and, in particular, to a wedge gate valve which cuts a flow of a flow path by a wedge-type valve disk to let a fluid to pass or stop the fluid and a rib setting method in a valve box of that valve.

2. Description of the Related Art

In the wedge-shaped gate valve of this type, a wedge-shaped valve seat is provided in a direction orthogonal to a flow path in the valve box and, with respect to this wedge-shaped valve seat, a wedge-shaped valve disk connected to the valve stem from a cylindrical branching part branched from the valve box is provided to make reciprocating movements to open and close the flow path. The wedge-type valve disk is attached so as to advance and retreat in a vertical direction in a state of being not fixed to the valve stem and with rotation of this valve stem. At the time of valve closing, the valve seat surface on a valve disk side makes contact with the valve seat on a valve box side to cause a closed state. After valve closing, the valve disk is moved by fluid pressure to a sealing direction with respect to the valve stem, causing the valve seat surface on the valve disk side to be pushed to the valve seat on the valve box side to allow sealing of the fluid.

To provide the above-described valve box of the gate valve, designing is performed so as to satisfy the standards such as JIS to ensure strength. In this regard, from reasons such as light weight of the valve, formability and processability, and cost incurred for materials, it is desired to manufacture the valve with the minimum material thickness so as to prevent an unwanted thickened portion as much as possible while satisfying the standards.

As a valve box for use in this gate valve, for example, a valve box for a gate valve of Japanese Utility-Model Application Laid-Open No. 57-98381 is disclosed. This valve box is formed of a steel plate, and is provided with an arcuate rib in the vicinity of a boundary with a branching part on an outer peripheral side of the valve box main body. The arcuate rib is provided in a range of an angle of elevation of approximately 45 degrees from the center of the valve seat. By providing this arcuate rib, it is tried to ensure strength of the valve box to prevent local warpage, thereby improving water-cutoff performance.

In a gate valve of Japanese Patent No. 5094753, a rib is provided at a corner part where the outer peripheral surface of the barrel part of the valve box main body and the outer surface of the valve disk accommodating part cross. This rib has a first rib body extending from an axial center direction of the valve stem, which is on a branching part side, along an axal center direction of the barrel part and a second rib body provided over both sides of the first rib body on the outer peripheral surface of the barrel part. With these first and second rib bodies, it is tried to ensure strength of the valve box to distribute stress.

As these, in the wedge-shaped gate valve, a rib or a protruding part is provided to the valve box desired to be made thinner. With these, it may be tried to prevent deformation and warpage of the valve box to ensure a wedge action between the valve disk and the valve seat at the time of valve closing, thereby enhancing sealability.

SUMMARY OF THE INVENTION

1. Technical Problem

When a valve box with a minimum material thickness described above is manufactured, the strength of the valve box may fall short at the time of high-pressure internal sealing at the time of valve closing to decrease pressure resistance. With this, the wedge-shaped valve seat surface of the valve box is deformed so that its angle is widened when internal pressure may be applied to the valve box, and the wedge angle of the valve seat on the valve box side with respect to the valve seat surface on a valve disk side may become unfit. As a result, the surface pressure applied to the seal surface of these valve seat surface on the valve disk side and seat surface on the valve box side becomes uneven, and a portion with insufficient surface pressure occurs to degrade sealability to cause valve seat leakage to occur easily.

In the case of the valve box for the gate valve of JP 57-98381, while the arcuate rib is provided in the vicinity of the boundary with the branching part on the outer peripheral side of the valve box main body, this arcuate rib is formed to have a uniform material thickness in part of the range of the angle of elevation of approximately 45 degrees from the center of the valve seat. When the rib with a uniform thickness is provided in this manner, the material thickness becomes more than required to increase weight, and processability at the time of casting may be degraded.

Moreover, in the gate valve of JP 5094753, rib bodies of two types, that is, the first rib body and the second rib body, are provided. Thus, compared with JP 57-98381, the weight of the rib portion tends to increase. Also, the first rib is formed to stand from a valve stem side over the barrel part and the second rib is formed in a flat shape on the outer peripheral surface of the barrel part, thereby also leading to degradation in castability.

Also, in these gate valves, the size of the rib, its range of formation, and so forth are not set. Thus, it is difficult prevent large deformation of the valve seat of the valve box in the vicinity of its upper part particularly at the time of high-pressure internal sealing due to shortage of stiffness and possible small deformation thereof also in the vicinity of its lower part. With that deformation unable to be suppressed, there is a possibility of degrading sealability of the valve seat to cause leakage.

In particular, in the case of a gate valve for ultra-low temperature, the entire valve is often provided as a metal as measures against ultra-low temperature, and the valve seat on the valve box side and the valve seat surface on the valve disk side are sealed by metal touch. Under ultra-low temperature conditions, the metal is hardened, and less tends to be deformed. Thus, when deformation of the valve seat occurs due to shortage of stiffness of the valve box, the valve disk does not follow that, and the contact surface pressure of the deformed portion falls short. When the seal surface has a portion with its contact surface pressure falling short, leakage from that portion tends to occur. In this manner, in the case of the gate valve for ultra-low temperature, compared with a valve for use under temperature conditions such as room temperature, the influence exerted by the deformation of the valve seat on the valve box side onto sealability is extremely large. If the stiffness of the valve box falls short, sealability is sharply decreased, and leakage tends to occur.

Here, as the valve disk of the gate valve, as a valve disk of the gate valve, there are a solid type, which is of an integral type with high stiffness, and a flexible type, which is provided with a notch in an opening/closing direction to be deformable to some extent. Under ultra-low-temperature conditions, there is also a possibility that deformation of the valve box that cannot be predicted occurs, compared with room-temperature conditions. By using a flexible-type valve disk, it may be preferable to enhance followability to the valve seat on the valve box side. However, under ultra-low-temperature conditions, even this flexible-type valve disk cannot be easily deformed and is difficult to sufficiently follow deformation of the valve box. In addition, since the metal is hardened compared with the time of room temperature, deformation such as warping of the valve disk is difficult. For example, there is a possibility of deformation in which, when an incision in an upper part fits in, an incision in a lower part is deformed to be widened accordingly. In this case, to obtain uniform surface pressure over the entire periphery of the seal surface, it is required to match deformations of the valve seat and the valve disk in consideration of both. This is also not an easy task at all.

The present invention has been developed to solve the conventional problem, and has an object of providing a wedge-shaped gate valve of, while reducing an unwanted thickened portion to improve light weight and castability, ensuring strength to include a valve box with high stiffness, preventing deformation of the valve seat surface of the valve box at the time of valve closing, and ensuring surface-pressure sealability with the valve disk to reliably prevent leakage.

2. Solution to the Problem

To achieve the above-described object, the claimed invention is directed to a gate valve with a branching part formed to be open in a direction orthogonal to an inner flow path of a valve box having a coupling part on each of both sides, in which a valve disk ascends and descends from this branching part via a valve stem to open and close an annular valve seat surface in the valve box, wherein, at a boundary between the coupling part and the branching part, a reinforcing thickened part having a substantially cylindrical shape or a substantially cone shape or substantially truncated cone shape with a diameter gradually reducing from this branching part toward the coupling part side is provided, and this thickened part is formed by taking, as an outer shape, a cylinder, a cone, or a truncated cone with an axis which is eccentric from a center line of the flow path to the branching part side and is parallel to or crossing the center line of the flow path taken as a rotation axis.

The invention according to another aspect is directed to the gate valve in which the rotation axis takes a position where a base of the cone and the center line of the flow path cross as a base point and is eccentric from this base point to the branching part side at a predetermined distance.

The invention according to another aspect is directed to the gate valve in which the rotation axis is eccentric to the branching part side so that a point of contact of the rotation axis and the valve seat surface is at a distance of 5 mm to 10 mm from the center line of the flow path.

The invention according to another aspect is directed to a gate valve with a branching part formed to be open in a direction orthogonal to an inner flow path of a valve box having a coupling part on each of both sides, in which a valve disk ascends and descends from this branching part via a valve stem to open and close an annular valve seat surface in the valve box, wherein, at a boundary between the coupling part and the branching part, a reinforcing thickened part having a substantially cylindrical shape or a substantially cone shape or substantially truncated cone shape with a diameter gradually reducing from this branching part toward the coupling part side is provided, and this thickened part is formed so as to, while maintaining a shape with a material thickness on a branching part side larger in a sectional direction than a valve disk accommodating part opposite thereto, have the material thickness gradually thinner at a predetermined rate as proceeding from a base side toward an upper surface side of the cone along a peripheral surface.

3. Advantageous Effects of the Invention

From the claimed invention, at a boundary between the coupling part and the branching part, a reinforcing thickened part having a substantially cylindrical shape or a substantially cone shape or substantially truncated cone shape with a diameter gradually reducing from this branching part toward the coupling part side is provided, and this thickened part is formed by taking, as an outer shape, a cylinder, a cone, or a truncated cone with an axis which is eccentric from a center line of the diameter in the flow path direction of the valve seat surface to the branching part side and is parallel to or crossing the center line of the flow path taken as a rotation axis. For example, the base side of the cone-shaped thickened part is provided to have a shape leaning to the branching part side, and the cone shape with the material thickness of the base of the thickened part on the branching part side being larger than the material thickness on the bottom surface of the valve box can be formed. With this, an unwanted thickened portion is reduced with the minimum-necessary reinforcing thickened part, and while light-weight and castability of the entire valve box is improved, the entire strength is increased mainly on the branching part side, and thereby the valve box with high stiffness can be configured. Even if a high-pressure fluid flows at the time of valve closing to increase internal pressure, the entire deformation, mainly the vicinity of the upper part of the valve seat surface, which tends to particularly be deformed, can be reliably prevented by the thickened part, the valve seat surface of the valve box and the valve seat part of the valve disk are uniformly sealed with surface pressure to allow reliable prevention of leakage.

Furthermore, even when an ultra-low-temperature fluid flows, shrinkage of the valve box due to this ultra-low-temperature fluid to cause deformation of the metal-made valve seat surface is prevented, metal-touch sealability between this valve seat surface and the valve seat seal surface of the valve disk is ensured, and sealability is ensured in a manner similar to that for a fluid at room temperature.

And, as described above, even when a flexible-type valve disk is applied to easily address deformation of the valve seat on the valve box side, by providing, the reinforcing thickened part made eccentric as in the present invention, it is possible to suppress deformation on the valve box side as much as possible. Thus, it is not required to consider deformation of the valve seat much. Even when a flexible-type valve disk is used, uniform surface-pressure seal can be easily obtained.

From the invention, while the thickened part with a necessary material thickness is ensured on the bottom surface side of the valve box, the thickened part thicker than the bottom surface side of the valve box can be provided on the branching part side. With this, while the strength of the entire annular valve seat surface is improved, the strength in the vicinity of the upper part of the valve seat surface, in particular, in the vicinity of the coupling part, is increased to allow reliable prevention of deformation on the upper part side, which tends to be deformed by the wedge-shaped valve seat.

In accordance with the invention, the strength on the upper part (branching part) side which tends to be deformed is enhanced by the reinforcing thickened part, and the valve box with high stiffness as a whole can be configured.

DETAILED DESCRIPTION OF AN EMBODIMENT OF THE INVENTION

In the following, the gate valve in the present invention is described in detail based on an embodiment. Depicted in FIG. 1 is an embodiment of the gate valve of the present invention, FIG. 2 is a longitudinal sectional view of a valve box of the gate valve of FIG. 1, and FIG. 3 depicts main parts of the valve box.

Figure 1:
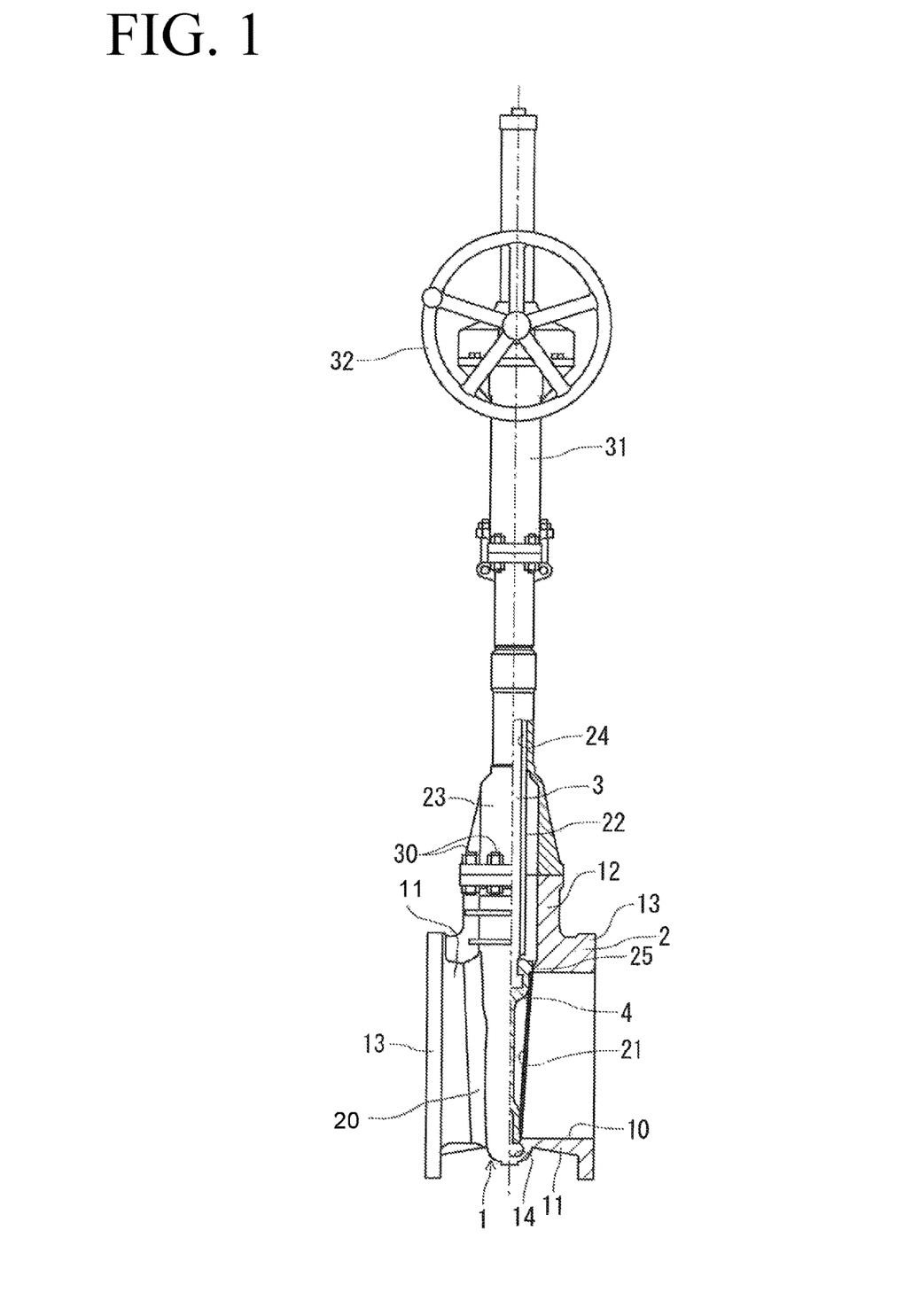
FIG. 1 is a partially-cutout front view depicting an embodiment of a gate valve in the present invention.
Figure 2:
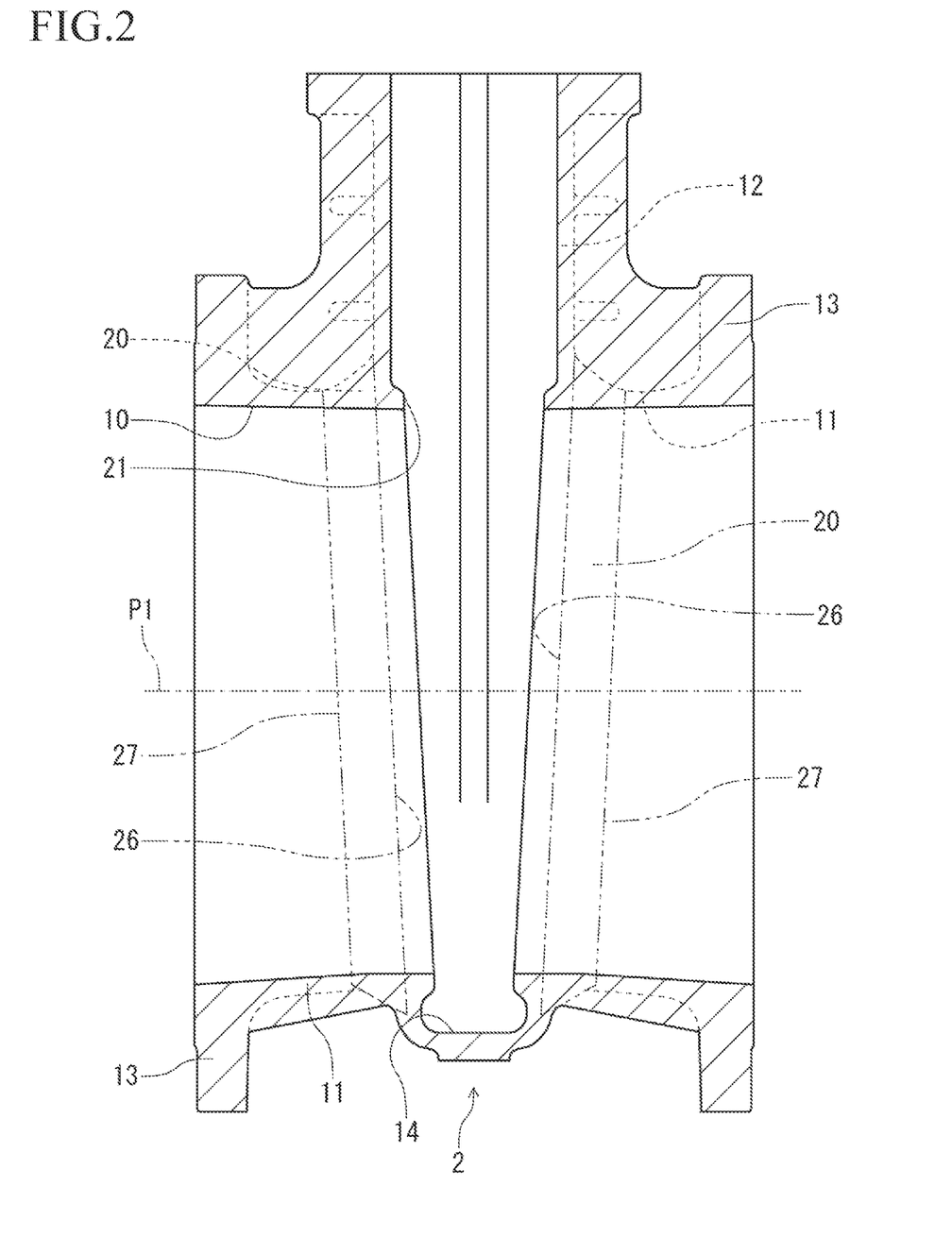
FIG. 2 is a longitudinal sectional view of a valve box.
Figure 3:
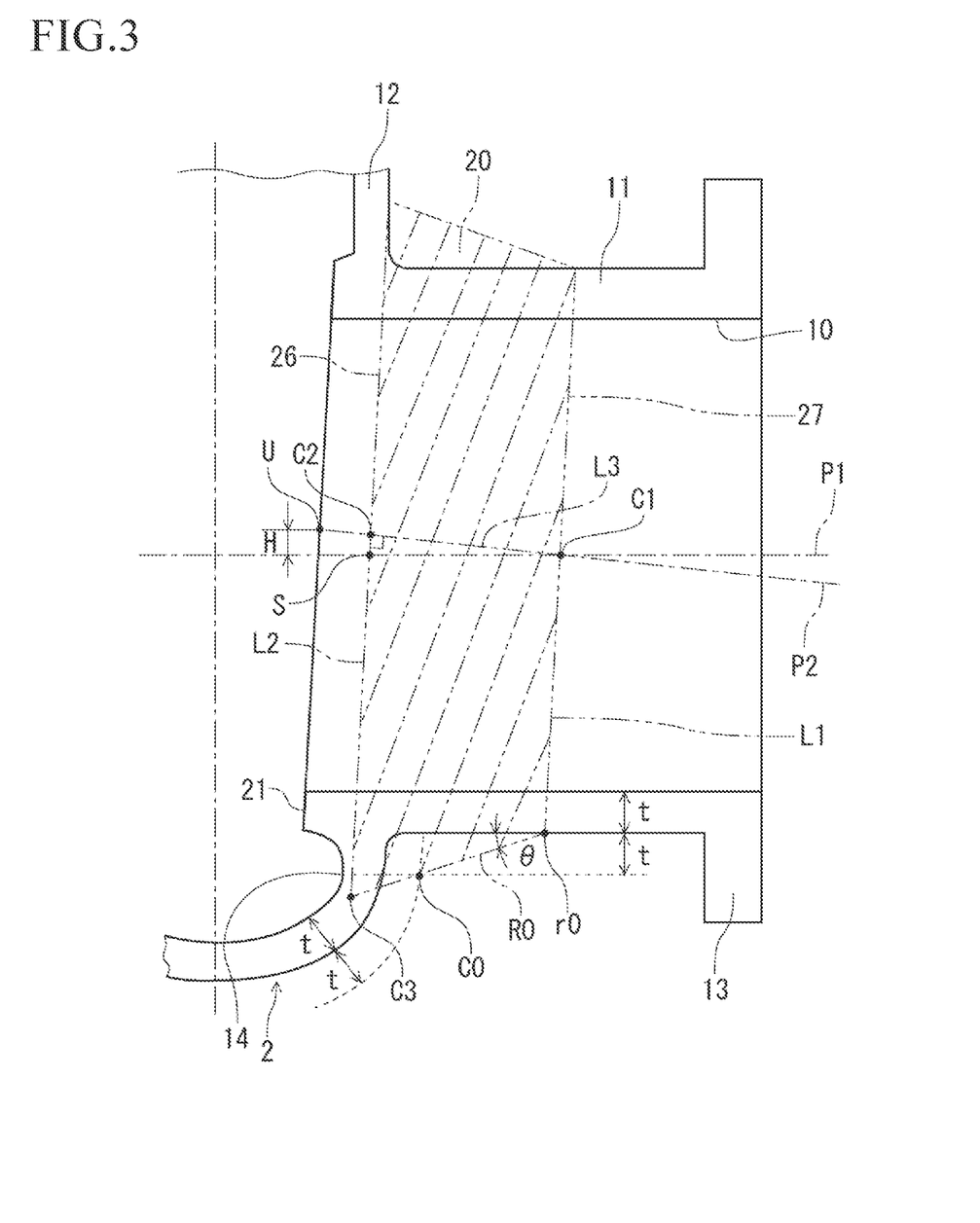
FIG. 3 is a general schematic view depicting main parts of the valve box.

In FIG. 1 to FIG. 3, the gate valve (hereinafter referred to as a valve main body 1) of the present invention is formed of a wedge gate valve, and is suitable particularly for an ultra-low-temperature fluid on the order of −50 degrees Celsius to −196 degrees Celsius for the use purpose of, for example, manufacturing LNG (liquefied natural gas), ethylene plants, opening and closing a flow path of an industrial low-temperature gas, and so forth. The valve main body 1 has a valve box 2, a valve stem 3, and a valve disk 4, and these are provided as being made of a material excellent in low-temperature characteristics. In the present embodiment, they are formed of a stainless material or a stainless alloy such as a stainless steel.

The valve box 2 is molded by, for example, casting, and has an inner flow path 10, coupling parts 11, 11 on both sides, and a branching part 12. Each coupling part 11 is formed in a substantially cylindrical shape and, in the present example, has a flange part 13 at an end part side. To this flange part 13, an outer plumbing not depicted can be connected. The branching part 12 is formed so as to be open on an upper part side of the valve box 2 between both coupling parts 11, 11 and the inside of this branching part 12 and the flow path 10 are in a communicating state. In a lower part of the center of the valve box 2, a valve disk accommodating part 14 is formed to protrude downward. In this valve disk accommodating part 14, the bottom part side of the valve disk 4 at the time of valve closing is provided so as to be able to be accommodated. Near a boundary between the coupling parts 11 and the branching part 12, a reinforcing thickened part 20 is provided, which will be described further below.

At seal positions on primary and secondary sides of the valve box 2 with respect to the valve disk 4, annular valve seat surfaces 21, 21 are respectively formed. These valve seat surfaces 21 are tilted in a sectional direction in FIG. 2 and FIG. 3 to a branching part 12 side at an angle on the order of 6 degrees to 10 degrees from a center line P1 of the flow path 10. Both of the valve seat surfaces 21, 21 are provided to form a V shape. Each valve seat surface 21 is formed of a metal sheet integrally formed inside the valve box 2, with its surface side subjected to sheet surface finishing with high accuracy. With this, stable seat sealability is exerted at the time of a metal touch with the valve disk 4.

In FIG. 1, a male screw 22 is formed on the outer periphery of the valve stem 3. The valve stem 3 is attached so as to be able to ascend and descend with respect to the valve box 3 via screwing between the male screw 22 and a female screw 24 formed on a lid 23, which will be described further below. At a tip side of the valve stem 3, the valve disk 4 is attached, and this valve disk 4 ascends and descends together with the valve stem 3. Note that the valve disk 4 may be caused to ascend and descend by operation other than this. For example, it may be configured in a manner such that a male screw is formed on the outer periphery of the valve stem 3 in the vicinity of a driving part 31, a sleeve provided with a female screw with which this male screw of the valve stem 3 is screwed is arranged on an inner peripheral side inside the driving part 31, and the sleeve rotates with rotation of a handle 32. In this case, the rotation of the handle 32 causes the sleeve to rotate, and the valve stem 3 screwed to this sleeve can ascend and descend as being in a non-rotating state.

The valve disk 4 is formed in a wedge shape in which both surfaces can abut on and seal the valve seat surfaces 21 of the valve box, and is attached to the valve stem 3 via an uneven attachment portion. In this attachment, the valve disk 4 and the valve stem 3 are not completely fixed together, but play is provided at the uneven attachment portion to the extent that the valve disk 4 slightly moves with respect to the valve stem 3. This attachment structure in a non-fixed state allows the valve disk 4 to move in a sealing direction with respect to the valve stem 3.

This valve disk 4 is provided so as to ascend and descend via the valve stem 3 from the branching part 12 to be able to open and close the valve seat surfaces 21 in the valve box 2. At the time of closing by the valve disk 4, annular valve seat parts 25 formed on both surface sides of the valve disk 4 are pushed by fluid pressure to the valve seat surfaces 21. By annular surface seal of these valve seat surfaces 21 and valve seat parts 25, the fluid is reliably sealed.

Figure 5:
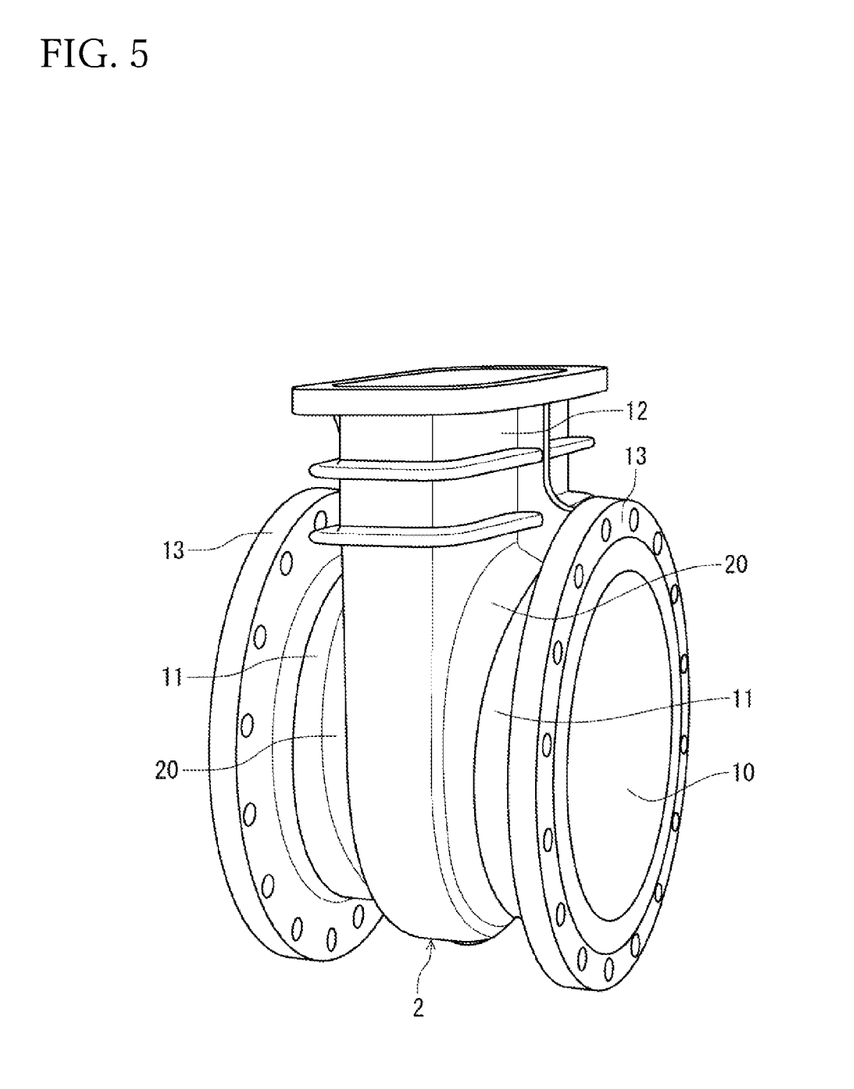
FIG. 5 is a perspective view of the valve box shown in FIG. 1.

As shown in FIG. 1 and FIG. 5, the above-described thickened part 20 of the valve box 2 is provided in a substantially cone shape with its diameter gradually reducing from the vicinity of the boundary between the coupling part 11 and the branching part 12 toward both sides of the coupling part 11 from this branching part 12. In this case, by setting an axis P2 eccentric from a center line P1 of the flow path to a branching part 12 side in a direction orthogonal to the valve seat surface 21, the thickened part 20 is formed so that a cone with the axis P2 as a rotating axis is taken as its outer shape. This configures the thickened part 20 in a substantially cone shape with its base 26 side being eccentric upward with respect to the coupling part 11. In FIG. 2 and FIG. 3, an upper part side of the thickened part 20 (branching part 12 side) is thicker than a lower part side (valve disk accommodating part 14 side).

In this regard, a position where the base 26 of the cone forming the thickened part 20 and the center line P1 of the flow path cross is taken as a base point S, and the rotation axis P2 is set so as to be eccentric from this base point S to the branching part 12 side at a predetermined distance.

Figure 4:
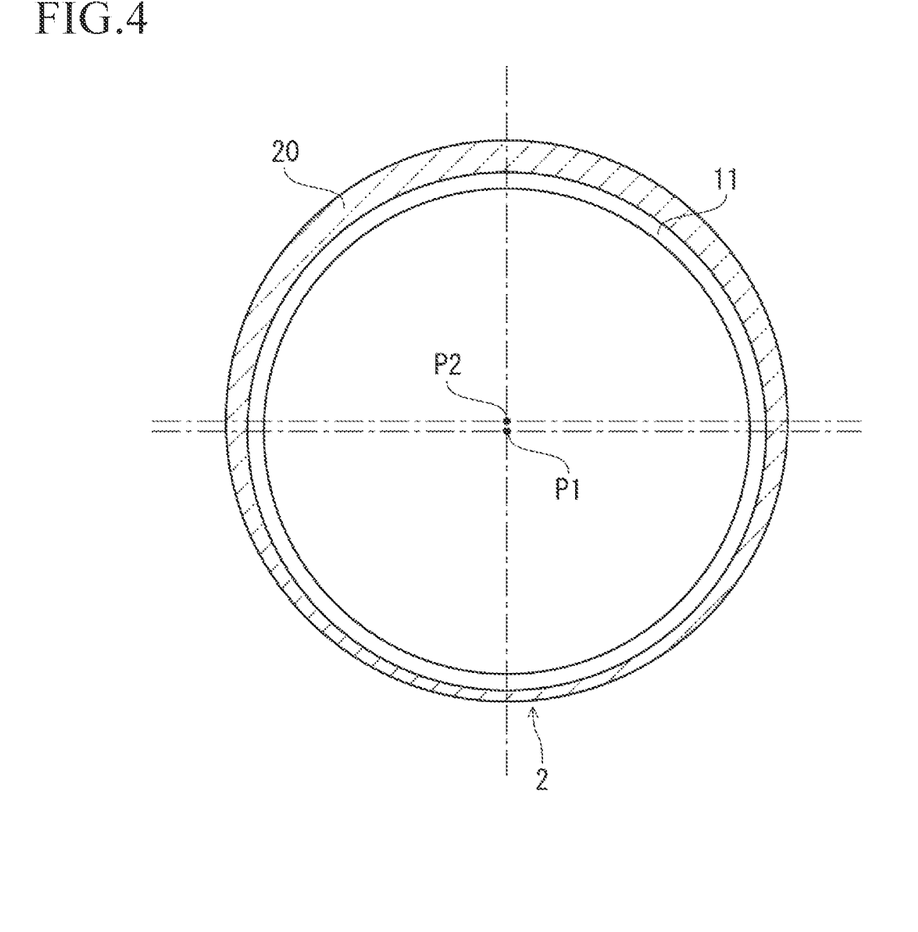
FIG. 4 is a schematic sectional view depicting a state of forming a rib in the valve box.

Depicted in FIG. 4 is a schematic sectional view of the base 26 side of the thickened part 20 (cone). In this manner, on the base 26 side, the thickened part 20 is gradually thicker in a circumferential direction of the coupling part 11 as approaching in a direction of the branching part 12, and the material thickness is at maximum at the position of crossing the branching part 12. On the other hand, the thickened part 20 is gradually thinner as approaching the valve disk accommodating part 14 side opposite to the branching part 12, the material thickness is at minimum at the position of crossing the valve disk accommodating part 14.

Also, on an upper surface 27 side of the thickened part 20 (cone), the material thickness of this thickened part 20 is at minimum. Also in this portion, an upper part side of the thickened part 20 (branching part 12 side) is thicker than a lower part side (valve disk accommodating part 14 side).

In a portion from the base 26 to a portion immediately before the upper surface 27 of the thickened part 20 (cone), as with the case of the base 26 side, the material thickness of the thickened part 20 on the branching part 12 side is at maximum in a sectional direction of FIG. 3, and the material thickness is gradually thinner as proceeding from this branching part 12 side along the circumferential direction toward the valve disk accommodating part 14 side.

In this manner, while maintaining the shape with its material thickness on the branching part 12 side being larger in the sectional direction, the thickened part 20 has the material thickness gradually thinner at a predetermined rate as proceeding from the base 26 side toward the upper surface 27 side along the peripheral surface.

In this case, in the present embodiment, in FIG. 3, the rotation axis P2 is eccentric to the branching part 12 side so that a point of contact U of the rotation axis P2 and the valve seat surface 21 is at a distance H of, for example, 5 mm to 10 mm, from the center line P1 of the flow path. With this, while the sectional shape of the thickened part 20 with its material thickness on the branching part 12 side being at maximum is maintained, the thickened part 20 is allocated over the entire perimeter of the coupling part 11 in a range of reaching the upper surface 27 side from the base 26 side.

As depicted in FIG. 1, on an upper portion of the valve box 2, the long lid 23 is fixedly attached in a sealed state with bolts and nuts 30. To an upper portion of this lid 23, the long operating part 31 is connected. The operating part 31 is provided with the rotating handle 32, and is provided in a manner as follows: rotating operation of this rotating handle 32 causes the valve stem 3 to rotate and, with this valve stem 3 operated to ascend and descend with respect to the valve box 2 via screwing of the male screw 22 and the female screw 24, the flow path 10 can be opened and closed by the valve disk 4 on a lower part side of the valve stem 3. In this manner, with the long lid 23 and the operating part 31 connected to the valve box 2 and the operating part 31 provided at a position separated upward from the valve main body 1, operation can be made while heat conduction of the ultra-low-temperature fluid to the operating part 31 is prevented.

Note that while the valve main body 1 has a metal-touch-seal structure and the valve is provided as one suitable for the ultra-low-temperature fluid in the above-described embodiment, a separate seat member may be attached inside the valve box to form a soft seat structure (not depicted), and the valve can be provided as a valve other than those for the ultra-low-temperature fluid.

Also, while the valve box structure is provided with the flange part 13 on the end part side of the coupling part 11, the end part side of the coupling part 11 can be provided so as to have any connection structure. As long as the valve box has the coupling part 11 with a sectional shape where the cone-shaped thickened part 20 can be formed, any sectional shape and any connection shape on the end part side can be set.

In the present example, the substantially-cone-shaped thickened part 20 is taken as an example. However, the thickened part 20 is not limited to have this shape, and may have, for example, a substantially cylindrical shape, a substantially truncated cone shape with its diameter gradually reducing from the branching part, or a stepwise structure with its base side in a cylindrical shape and becoming a cone shape in the middle. In the thickened part having a sectional structure formed of a polygon axisymmetric with respect to a predetermined center line and having a shape obtained by rotating the structure about the center line, if the thickened part has a shape in which this center line is eccentric from the center of the fluid to the branching part side, it is possible to reinforce the stiffness of the valve box, which is preferable for the gate valve. However, in consideration of castability and so forth, the cone shape tends to be preferable.

In the thickened part, in addition to the above-described case in which the axis P2 is provided as a rotation axis, an axis which is in a state of being eccentric from the center line P1 of the flow path to the branching part side and is parallel to or crossing the center line P1 of the flow path may be provided as a rotation axis.

Next, a method of manufacturing the above-described gate valve is described.

In the gate valve manufacturing method of the present example, designing is performed with a scheme of taking the outer perimeter of the coupling part 11 as a reference position and setting the thickened part 20 at a predetermined size from this reference position, and thereby the thickened part 20 (cone) has the same shape as that when the position where the base 26 and the center line P1 of the flow path cross is taken as the base point S.

Specifically, in FIG. 3, to set the shape of the valve box 2, the method is performed with the following first to sixth procedures.

To provide the thickened part 20, in order to provide a thickened portion having a thickness allowing sufficient strength to be obtained, as the first procedure, a sectional shape of the thickened part 20 of the lowermost part of the valve box 2 is specified. In this case, the bottom surface part 14 of the outer perimeter of the coupling part 11 is taken as a reference position, and provided is a point of intersection C0 of a line segment larger than the material thickness of the bottom surface of the coupling part 11 and a line segment larger than the material thickness of the side surface of the valve disk accommodating part 14 where the bottom part side of the valve disk 4 is accommodated.

In the present example, as described above, as a sufficient thickness with respect to a minimum material thickness t required by the standards, the material thickness of the bottom surface of the outer perimeter of the coupling part 11 is assumed to be set as, for example, doubled, and a point of intersection of a line segment obtained by doubling a material thickness t of the bottom surface of the coupling part and a line segment obtained by doubling the material thickness of the side surface of the valve disk accommodating part 14 where the bottom part side of the valve disk 4 is accommodated is set as the point of intersection C0. Note that a value suitable as an assumed material thickness of the bottom surface of the outer perimeter of the coupling part 11 varies in accordance with the size of the valve. That is, if the size of the valve is large, the thickened part 20 is not required to be thicken much because the valve box is originally thick. However, when the size of the valve is small, the valve box is thin, and therefore the thickened part 20 is preferably thickened accordingly.

Next, as the second procedure, a rib plane R0 at a predetermined angle is set, which passes through the point of intersection C0 and connects the valve disk accommodating part 14 side and the coupling part 11 side with a gentle angle. The rib plane R0 is set as a tilted plane with a crossing angle θ with the center line P1 of the flow path on the order of 15 degrees to 40 degrees, for example, on the order of 30 degrees. In FIG. 3, the crossing angle θ is depicted by using the outer perimeter of the coupling part 11 parallel to the center line P1 of the flow path.

Thirdly, from a point of intersection r0 of the rib plane R0 and the outer perimeter of the coupling part 11, a line parallel to the valve seat surface 21 is drawn toward above the valve box 2 to a point of intersection C1 with the center line P1 of the flow path, and is set as a line segment L1.

Fourthly, a line perpendicular to the valve seat surface 21 is drawn from the point of intersection C1, and a point of intersection C2 of this line and a line drawn to pass through the upper part side of the valve disk accommodating part 14 in parallel to the valve seat surface 21 is found, and a line segment L3 from the point of intersection C1 to the point of intersection C2 is set.

Fifthly, a line parallel to the valve seat surface 21 is drawn from the point of intersection C2 toward the rib plane R0 to find its point of intersection C3, and a line segment L2 from the point of intersection C2 to the point of intersection C3 in parallel to the valve seat surface 21 is set.

Via the above first to fifth procedures, the rib plane R0 and the line segments L1, L3, and L2 are each set. Furthermore, in the sixth procedure, a half trapezoid surrounded by the rib plane R0 and the line segments L1, L3, and L2 is set, and this half trapezoid is rotated by 360 degrees by taking the line segment L3 as an axis, thereby setting a portion extending off the outer perimeter of the coupling part 11 as an outer shape of the thickened part 20 reinforcing the valve box 2.

In the above-described method of manufacturing the valve box 2, designing is performed so that a trapezoid axisymmetric with respect to the line segment L3 is set and a cone obtained by rotating this trapezoid about the rotation axis P2 including the line segment L3 becomes the thickened part 20. By designing the thickened part 20 with this scheme, the point of intersection C2, which is the center of the lower base of this trapezoid, is the center of the base 26 of the thickened part 20 (cone), and this center is made eccentric (offset) upward (branching part 12 side) from the base point S (the position where the base 26 of the cone and the center line P1 of the flow path cross). The amount of this eccentricity is preferably such that a distance between the point of contact U of the rotation axis P2 and the valve seat surface 21 and a point of contact of the center line P1 of the flow path and the valve seat surface 21 is in a range of 1% to 10% with respect to the diameter of the flow path. As described above, the thickness of the thickened part 20 can be decreased as the valve is larger. Thus, the amount of this eccentricity is preferably approximately in a range of 1 mm to 10 mm, preferably in the neighborhood of 5 mm.

Note that the scheme of designing the thickened part 20 is not limited to the present example, and is not particularly limited as long as it is a method capable of configuring an eccentric shape similar to the above. For example, the center line P1 eccentric from the base point S from the beginning may be defined, and the thickened part 20 may be designed based on that center line P1. In view of obtaining the material thickness of the thickened part 20 required for reinforcement, the method of the present example of first setting the required material thickness t of the bottom surface of the coupling part may be preferable.

Reinforcement by the thickened part 20 is effective for a valve of any size. In particular, in a valve having an intermediate or large diameter (for example, on the order of 4 inches to 24 inches), an effect of reinforcing the valve box 2 itself and an effect of reinforcing, in particular, an upper part of the valve box, by eccentricity of the thickened part 20 tend to be easily obtained.

Next, the operation of the gate valve of the present invention in the above-described embodiment is described.

As depicted in FIG. 1 to FIG. 3, an axis eccentric at the base point S from the center line P1 of the flow path to the branching part 12 side at a predetermined distance and in a direction orthogonal to the valve seat surface 21 is taken as the rotation axis P2 and, by taking a cone obtained based on this rotation axis P2 as an outer shape, the substantially-cone-shaped reinforcing thickened part 20 with its diameter gradually reducing from the vicinity of the boundary between the coupling part 11 and the branching part 12 is integrally formed with the valve box 2. Thus, the valve seat surface 21 is reinforced by the thickened part 20, without forming a rib-shaped reinforcing part between the coupling part 11 and the branching part 12. With this substantially-cone-shaped thickened part 20, an increase in the material thickness due to the thickened portion is suppressed to become minimum necessary, and an increase in weight is also suppressed. With the rib plane R0 passing through the point of intersection C0, the valve disk accommodating part 14 side and the coupling part 11 side are gently connected, and this rib plane R0 is taken as the outer peripheral surface of the thickened part 20, thereby improving castability.

As depicted in FIG. 4, the thickened part 20 has an upper part side (branching part 12 side) in the sectional direction of the valve box thicker than a lower part side (valve disk accommodating part 14 side), and the material thickness on the branching part 12 side is at maximum in a range from the base 26 side of this thickened part 20 (cone) to reach the upper surface 27 side and, from this branching part 12 side to the valve disk accommodating part 14 side, the material thickness is gradually decreased along the circumference of the branching part 12. In this manner, with the thickened part 20 being set so that the strength on the branching part 12 side is increased more, it is possible to provide the thickened part 20 having a wedge shape and increasing so as to be inversely proportional to the shape of the valve box 2 with its strength decreasing as proceeding to the upper part side. With this thickened part 20, the valve box 2 is reinforced. With this, mainly on the upper part side of the valve box 2, which is particularly deformable, the strength is improved over the entire perimeter of the coupling part 11 to prevent deformation of the entire annular valve seat surface 21, and close-contact sealability at the time of valve closing between this valve seat surface 21 and the valve seat part 25 on the valve disk side is maintained to reliably prevent leakage.

To reinforce the upper part of the valve box, it can be thought that, for example, the thickened part is provided only on the upper part side of the valve box. In that case, there is a possibility of increasing a difference in strength at the boundary provided with the thickened part. In particular, for the purpose of use under ultra-low temperature, shrinkage of the material of the valve box also tends to occur. Thus, that difference in strength may possibly become a factor in causing uneven deformation. To address this, in the present invention, the thickened part is provided not only on the upper part side but also on the lower part side, and these are made eccentric to the upper part side as a whole. Thus, there is no portion where a difference in strength significantly occurs, and it is possible to reinforce a necessary portion as required as a whole.

To provide the valve box 2, as described above, by taking the bottom surface part of the outer perimeter of the coupling part 11 as a reference position and, from this reference position, a semi trapezoid is set via the points of intersection C0, r0, C1, C2, and C3, the line segments L1, L2, and L3, the rib plane R0, and the center line P1 of the flow path. This semi trapezoid is rotated at 360 degrees about the line segment L3 to configure the outer shape of the thickened part 20. Thus, it is possible to configure the thickened part 20 having the same shape as that when the thickened part 20 is provided about the rotation axis P2 from the base point S. With this, compared with the case of setting the thickened part 20 from the base point S, which is difficult to set inside the valve box 2 at the time of actual manufacturing, the thickened part 20 having a predetermined shape can be easily set from the outer perimeter of the coupling part 11. Furthermore, the thickened part 20 having an appropriate material thickness can be set to the valve box 2 so as to correspond to any outer diameter and whole shape.

EXAMPLE

As a specific example of the gate valve of the present invention configured as described above, the following specific example is exemplarily described. However, the gate valve of the present invention is not limited to this specific example.

In the present specific example, in the gate valve of size 18B, the assumed material thickness of the bottom surface of the outer perimeter of the coupling part 11 in the first procedure was set as a double of the minimum material thickness of the valve box, and the crossing angle θ of the rib plane R0 with the center line P1 of the flow path was set at 30 degrees, and the thickened part 20 was designed with the first to sixth procedures. As a result, at a boundary portion between the coupling part 11 and the branching part 12, the thickness of the thickened part 20 (thickness increased by providing the thickened part 20 to the outer peripheral surface of the coupling part 11) resulted in an increase in thickness of the upper part side by 23% with respect to the lower part side of the thickened part 20.

For the gate valve of this specific example, as a result of performing a simulation of a distribution of contact pressures on the outer perimeter side of a secondary seat surface, which contributes to sealing performance most, variations in contact pressure in a circumferential direction were decreased by 52%. In gate valves, in particular, in gate valves for ultra-low temperature, if the contact pressure on the secondary seat surface is varied, leakage tends to occur from a portion with a low contact pressure. Thus, this variation value is preferably small. And, the result of the present specific example was a significant improvement, with respect to the simulation result when the thickened part is provided without being made eccentric.

While the embodiment of the present invention has been described in detail in the foregoing, the present invention is not limited to the description of the above embodiment, and can be variously changed in a range not deviating from the spirit of the invention described in the scope of the claims for patent of the present invention.

REFERENCE SIGNS LIST 1 valve main body
2 valve box
3 valve stem
4 valve disk
10 flow path
11 coupling part
12 branching part
14 valve disk accommodating part
20 thickened part (cone)
21 valve seat surface
26 base of the cone
C0, C1, C2, C3, r0 point of intersection
H distance
L1, L2, L3 line segment
P1 center line of the flow path
P2 axis (rotation axis)
R0 rib plane
S base point
U point of contact
t material thickness

The invention claimed is:

1. A gate valve with a branching part formed to be open in a direction orthogonal to an inner flow path of a valve box having a coupling part on each of both sides, in which a valve disk ascends and descends from this branching part via a valve stem to open and close an annular valve seat surface in the valve box, wherein, at a boundary between the coupling part and the branching part, a reinforcing thickened part having a substantially cylindrical shape or a substantially cone shape or substantially truncated cone shape with a diameter gradually reducing from this branching part toward the coupling part side is provided, and this thickened part is formed by taking, as an outer shape, a cylinder, a cone, or a truncated cone with an axis which is eccentric from a center line of the flow path to the branching part side and is parallel to or crossing the center line of the flow path taken as a rotation axis.

2. The gate valve according to claim 1, wherein the rotation axis takes a position where a base of the cone and the center line of the flow path cross as a base point and is eccentric from this base point to the branching part side at a predetermined distance.

3. The gate valve according to claim 2, wherein the rotation axis is eccentric to the branching part side so that a point of contact of the rotation axis and the valve seat surface is at a distance of 5 mm to 10 mm from the center line of the flow path.

4. A gate valve with a branching part formed to be open in a direction orthogonal to an inner flow path of a valve box having a coupling part on each of both sides, in which a valve disk ascends and descends from this branching part via a valve stem to open and close an annular valve seat surface in the valve box, wherein, at a boundary between the coupling part and the branching part, a reinforcing thickened part having a substantially cylindrical shape or a substantially cone shape or substantially truncated cone shape with a diameter gradually reducing from this branching part toward the coupling part side is provided, and this thickened part is formed so as to, while maintaining a shape with a material thickness on a branching part side larger in a sectional direction than a valve disk accommodating part opposite thereto, have the material thickness gradually thinner at a predetermined rate as proceeding from a base side toward an upper surface side of the cone along a peripheral surface.

\* \* \* \* \*